United States Patent

[11] 3,615,634

[72] Inventors Johannes Götze
Bergisch-Neukirchen;
Oskar Riester, Leverkusen, Germany;
Herman Adelbert Philippaerts, Mortsel;
Theofiel Hubert Ghys, Kontich, Belgium;
Marie Hase, Schildgenbergisch-Gladbach;
Karl Küffner, Unterhaching b. near
Muenchen, Germany
[21] Appl. No. 718,127
[22] Filed Apr. 2, 1968
[45] Patented Oct. 26, 1971
[73] Assignee AGFA-Gevaert Aktiengesellschaft
Leverkusen, Germany
[32] Priorities Apr. 10, 1967
[33] Germany
[31] A 55 409;
Aug. 24, 1967, Germany, A 56 590

[54] OPTICALLY SENSITIZED LIGHT-SENSITIVE SILVER HALIDE MATERIAL
8 Claims, 3 Drawing Figs.
[52] U.S. Cl. .................................................. 96/124,
96/109
[51] Int. Cl. ...................................................... G03c 1/28
[50] Field of Search ............................................ 96/104, 109

[56] References Cited
UNITED STATES PATENTS
2,430,072 11/1947 Nicholson et al. ............ 96/104
3,432,303 3/1969 Jones et al. .................... 96/104

*Primary Examiner*—J. Travis Brown
*Attorney*—Connolly and Hutz

ABSTRACT: Silver halide emulsions are very effectively sensitized to red with combination of two dyes

PATENTED OCT 26 1971　　　　　　　　　　　　　　3,615,634

INVENTORS:
JOHANNES GÖTZE, OSKAR RIESTER, HERMAN ADELBERT PHILIPPAERTS,
THEOFIEL HUBERT GHYS, MARIE HASE, KARL KÜFFNER.
BY
Connolly and Hutz
their attorneys

OPTICALLY SENSITIZED LIGHT-SENSITIVE SILVER HALIDE MATERIAL

It has been known for a long time that the sensitivity of light-sensitive layers, especially silver halide emulsion layers, may be increased by adding substances which increase their range of spectral sensitivity. Numerous substances which mainly belong to the class of cyanine dyes have been described for so sensitizing silver halide emulsion layers.

The sensitization of silver halide emulsion layers in the far red region between about 700–850 millimicrons gives rise to special difficulties. Various sensitizing dyes have been described for this spectral region, e.g. tetramethine merocyanines, rhodacyanines, pentamethine dyes and certain groups of carbocyanines. All dyes of these groups have serious disadvantages when used for sensitizing highly sensitive silver iodobromide emulsions.

Tetramethine merocyanines and rhodacyanines are suitable mainly for sensitizing silver chloride or bromide emulsions that contain color couplers but not for silver iodobromide emulsions of maximum sensitivity. The sensitivities achieved with these compounds are unsatisfactory when compared with the intensity of panchromatic sensitization nowadays achieved with highly sensitive materials in the region of 650 to 690 millimicrons.

Apart from their insufficient sensitizing action and storage stability, pentamethine dyes show incompatibility with other sensitization dyes for shorter wavelength.

Trimethine cyanines that have at least one quinoline nucleus have an absorption maximum at about 580 millimicrons and a sensitization maximum at 610 millimicrons. By introducing substituents in the meso position of the trimethine chain the sensitization maxima of these dyes are shifted to wavelengths above 700 millimicrons. N-methyl-benzothiazole-N-methylquinoline trimethine cyanine substituted by an ethyl group in the meso position has an extraordinary maximum of 730 millimicrons. This phenomenon can be observed in a large number of meso-alkyl-substituted asymmetrical thio- and selnoguinocarbocyanines, especially in those derived from 5,6-henzoquinoline. Nevertheless, these and similar dyes are of limited utility either because they cause fogging of the silver halide emulsion and because the sensitizing activity is insufficient, or because the spectral sensitivity does not extend uniformly over the visible and far red region of the spectrum which is desirable for certain applications.

The object of this invention is to provide substituents sensitized silver halide emulsion layer the sensitivity of which extends up to the far red region of the spectrum.

We now have found that photographic silver halide emulsions can be sensitized to maximum sensitivity in the far red region of the spectrum by applying a mixture of two types of sensitizing dyes. The first group of these sensitizing dyes comprises dyes of the following formula:

I in which

Q represents sulfur or selenium;

Y stands for hydrogen, a dioxymethylene group, a fused-on benzene ring or one or more of alkyl, alkoxy, or alkylthio, the alkyl groups of which have preferably up to 5 carbon atoms, or halogen such as chlorine, bromine or iodine.

R represents alkyl with up to 3 carbon atoms;

R' and R'' stands for alkyl including substituted alkyl, e.g., alkyl with 1 to 4 carbon atoms substituted in the β-, γ- or ω-position by a hydroxyl group, a sulfo group, a sulfato group, a carboxyl group, a $CO-NH-SO_2$-alkyl group or an $-SO_2-NH-CO$-alkyl group in acid or salt form such as the alkali metal or ammonium salt, e.g. the sodium salt or trimethylammonium salt;

X denotes any anion, e.g. bromide, iodide or methyl sulfate, or does not exist when R' or R'' itself contains an anionic group;

Z represents hydrogen, alkyl with up to 3 carbon atoms, preferably methyl, alkoxy or a fused-on benzene ring.

The above quinoline dyes are applied in combination with seleno- or thiocarbocyanines of the following formula:

wherein

Q,R,R',R'' and X have the same meanings as above.

A and B represent hydrogen, a fused-on benezene ring, preferably in the 4.5-position, a dioxymethylene group, preferably in the 5.6-position or one or more of: alkyl, alkoxy, or alkylthio, the alkyl groups of which having preferably up to 5 carbon atoms, or halogen such as chlorine, bromine or iodine; and

Q' stands for sulfur or selenium.

The dyes of formula I have an extraordinary maximum above 700 millimicrons and are completely compatible with the dyes of formula II. The tendency of dyes of formula I to cause fogging is now surprisingly practically completely suppressed (particularly in high-sensitive silver halide emulsions) by combining them with sensitizing dyes of formula II, and, in addition, a considerable increase in the sensitizing effect in the deep red region is achieved. This was all the more unexpected since dyes of group II normally only sensitize below 700 millimicrons, when used alone.

Particular utility is exhibited by combining dyes of the following formulae:

| Dyes of Formula I | Sensitization maximum in millimicrons |
|---|---|
| I/1  | 740 |

| Dyes of Formula I | Sensitization maximum in millimicrons |
|---|---|
| I/2 | 750 |
| I/3 | 740 |
| I/4 | 730 |
| I/5 | 730 |
| I/6 | 750 |
| I/7 | 740 |

| Dyes of Formula I | Sensitization maximum in millimicrons |
|---|---|
| I/8  | 725 |
| I/9  | 730 |
| I/10  | 740 |
| I/11  | 71 |
| I/12  | 72 |
| I/13  | 730 |
| I/14  | 730 |
| I/15  | 725 |

I/16

I/17

| | Dyes of Formula II | |
|---|---|---|
| II/1 |  | 670 |
| II/2 |  | 680 |
| II/3 |  | 680 |
| II/4 |  | 685 |
| II/5 |  | 665 |
| II/6 |  | 685 |
| II/7 |  | 655 |

| | | |
|---|---|---|
| II/8 |  | 660 |
| II/9 |  | 660 |
| II/10 |  | 655 |
| II/11 |  | 670 |
| II/12 |  | 640 |
| II/13 |  | 660 |
| II/14 |  | 645 |
| II/15 |  | 645 |
| II/16 |  | |
| II/17 |  | |

| | | |
|---|---|---|
| II/18 |  | 650 |
| II/19 |  | 650 |
| II/20 |  | 655 |
| II/21 |  | 650 |
| II/22 |  | 660 |
| II/23 |  | 660 |
| II/24 |  | 660 |
| II/25 |  | 660 |
| II/26 |  | 660 |
| II/27 |  | 660 |
| II/28 |  | 675 |

| | | |
|---|---|---|
| II/29 |  | 690 |
| II/30 |  | 680 |
| II/31 |  | 685 |
| II/32 |  | 630 |
| II/33 |  | 645 |
| II/34 |  | 650 |
| II/35 |  | 650 |
| II/36 |  | 650 |
| II/37 |  | 650 |
| II/38 |  | 640 |

The preparation of photographic silver halide emulsions substantially comprises three steps:
1. Precipitation of the silver halide in the presence of a protective colloid and physical ripening.
2. Removal from the emulsion of excess water-soluble salts introduced during precipitation, generally by washing, and
3. Chemical ripening or after-ripening, which serves to impart the desired sensitivity to the emulsion.

The sensitizing dyes according to the present invention can be used in any silver halide emulsions. Suitable silver halides are silver chloride, silver bromide or mixtures thereof, if desired containing a small amount of silver iodide up to 10mols percent. The silver halides may be dispersed in the usual hydrophilic compounds, for example, carboxymethylcellulose, polyvinyl alcohol, polyvinyl pyrrolidone, alginic acid and its salts, esters or amides or preferably gelatin.

The sensitizing dyes to be used according to the present invention are advantageously added to the photographic emulsion before the chemical ripening or before casting. The methods employed for this are generally known to persons skilled in this art. The sensitizing dyes are generally incorporated in the emulsion in the form of solutions, e.g., in alcohol or mixtures of alcohol and water. The solvents must, of course, be compatible with gelatin and must not have any adverse effects on the photographic properties of the emulsion. Water, methanol or mixtures thereof are generally used as solvents. The quantity of sensitizing dye added may vary within wide limits, e.g., between 2 and 200 mg. preferably between 10 and 100 mg. per kg. of the silver halide emulsion. The concentration of dye may be adapted to the particular requirements, depending on the type of emulsion, the desired sensitizing effect etc. The most suitable concentration for any given emulsion can easily be determined by the usual tests employed in the art of emulsion making.

The emulsions may also contain chemical sensitizers, e.g., reducing agents such as stannous salts, polyamines such as diethylentriamine, or sulfur compounds as described in U.S. Pat. No. 1,574,944. Furthermore, salts of noble metals, such as ruthenium, rhodium, palladium, iridium, platinum or gold may be contained in the emulsions for chemical sensitization, as described in the article by R. Koslowsky, Z.wiss.Pot. 46, 65–72 (1951). The emulsions may also contain, as chemical sensitizers, polyalkylene oxides, especially polyethylene oxide and derivatives thereof.

The emulsions according to the present invention may contain the usual stabilizers such as homopolar or salt-type compounds of mercury with aromatic or heterocyclic rings, such as mercaptotriazoles, simple mercury salts, sulfonium mercury double salts and other mercury compounds. Other suitable stabilizers are azaindenes, especially tetra- or pentaazaindenes, in particular those that are substituted with hydroxyl or amino groups. Compounds of this type are described in the article by Birr, Z.wiss.Phot. 47, 2–58 (1952). Other suitable stabilizers include heterocyclic mercapto compounds, e.g., phenylmercaptotetrazole, quaternary benzothiazole derivatives and benzotriazole.

The emulsions may be hardened in the usual manner, for example, with formaldehyde or by use of halogen-substituted aldehydes which contain a carboxyl group, e.g., mucobromic acid, diketones, methanesulfonic acid esters and dialdehydes.

EXAMPLE 1

A highly sensitive silver bromide gelatine emulsion containing 3 mols percent OF silver iodide, and the usual additives such as 0.35 g. of saponin as wetting agent, 5 ml. of a 30 percent aqueous formaldehyde solution as hardener and 300 mg. of 1,3,3a,7-tetraaza-4-hydroxyl-6 methylidene as a stabilizer, is divided into several parts.

To the separate parts are added, per kg., the quantities of sensitizing dyes shown in the following table 1. The emulsions are then applied onto a cellulose triacetate support in the usual manner and dried.

The layers obtained are exposed in a conventional sensitometer behind a step wedge with a rise of 2 behind a red filter.

The exposed samples are developed and fixed in the usual manner. The sensitometric results are shown in the following table 1. The relative sensitivities are indicated by the number of measurable steps of the wedge.

TABLE 1

| Experiment | Sensitizing dyes of formula I | | Dyes of formula II | | Relative sensitivity | Fog. |
|---|---|---|---|---|---|---|
| | Quantity mg. | No. | Quantity mg. | No. | | |
| 1 | 45 | I/3 | | | 12 | Fog. |
| 2 | 30 | I/3 | 15 | II/1 | 14 | Clear. |
| 3 | 45 | I/2 | | | 11 | Fog. |
| 4 | 30 | I/2 | 15 | II/1 | 13 | Clear. |
| 5 | 45 | I/1 | | | 11 | Fog. |
| 6 | 30 | I/1 | 15 | II/1 | 16 | Clear. |
| 7 | 45 | I/8 | | | 17 | 0.24. |
| 8 | 30 | I/8 | 15 | II/1 | 20 | 0.12. |
| 9 | 45 | I/6 | | | 13 | 0.32. |
| 10 | 30 | I/6 | 15 | II/1 | 17 | 0.26. |
| 11 | 30 | I/6 | 30 | II/1 | 18 | 0.23. |
| 12 | 45 | I/5 | | | 19 | 0.44. |
| 13 | 30 | I/5 | 15 | II/3 | 22 | 0.18. |
| 14 | 30 | I/5 | 15 | II/4 | 21 | Clear. |
| 15 | 30 | I/5 | 15 | II/1 | 22 | Do. |
| 16 | 30 | I/5 | 15 | II/5 | 21 | Do. |
| 17 | 45 | I/4 | | | 8 | 0.62. |
| 18 | 45 | I/4 | 30 | II/1 | 15 | 0.34. |
| 19 | 45 | I/8 | | | 20 | 0.27. |
| 20 | 30 | I/8 | 15 | II/5 | 21 | 0.11. |
| 21 | 30 | I/8 | 15 | II/6 | 22 | 0.12. |
| 22 | 45 | I/6 | | | 12 | 0.45. |
| 23 | 30 | I/6 | 30 | II/7 | 15 | 0.28. |
| 24 | 45 | I/10 | | | 14 | 0.40. |
| 25 | 30 | I/10 | 15 | II/1 | 18 | 0.23. |

Figure 1:
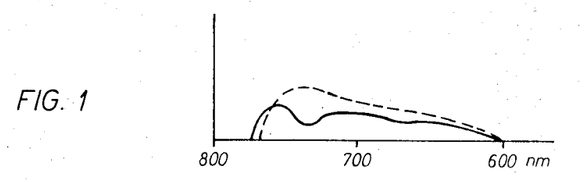
Figure 2:
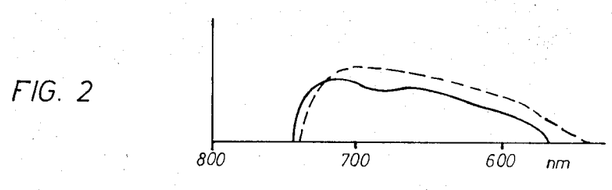
Figure 3:
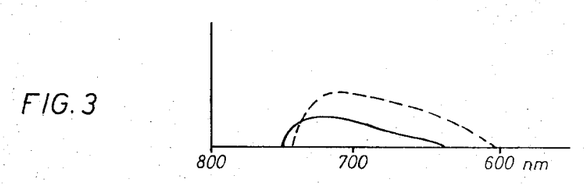

The sensitograms of experiments 3 and 4, 12 and 16, and 24 and 25 are shown in Figures 1 to 3 respectively. In the graphs, the intensity of sensitization is plotted as the axis of ordinates against the wavelengths as the axis of abscissae. The full line curves in the three pairs of experiment represents the sensitization of the deep red sensitization of dyes of formula I alone, and the broken line curves represent the sensitization of the combination according to the invention.

The above experiments demonstrate that fogging caused by dyes of formula I is reduced and, in addition, a considerable increase in sensitivity is achieved. The sensitization maxima of the sensitization dyes of formula I are shifted hypsochromically by up to about 20 millimicrons when used in combination with dyes of formula II

Example 2

A silver iodobromide emulsion of medium sensitivity containing 47 mols percent of silver iodide and the usual additives described in example 1 is divided into several portions.

Sensitizing dyes in the amounts per kg. indicated in the following table are added to the individual portions which contain 0.3 mols of silver halide per kg. The emulsions are then applied on a cellulose triacetate support in the usual manner and dried.

The layers obtained are exposed in a conventional sensitometer behind a step wedge of constant 0.15, once without filter (general sensitivity) and once behind a yellow filter (spectral sensitization sensitivity).

The transmission of the yellow filter for light 0.1 a wavelength shorter than 495 millimicrons is less than 0.1 percent; for light having a wavelength of 550 millimicrons and longer the transmission is higher than 90 percent.

The exposed samples are developed and fixed in the usual manner. The sensitometric results are shown in table 2 below. The sensitivities are given as the number of measurable steps of the wedge.

TABLE 2

| Experiment | Sensitizing dyes | | | | Sensitivity | | Fog | Sensitization maximum, mμ |
|---|---|---|---|---|---|---|---|---|
| | Formula I | | Formula II | | | | | |
| | No. | Amount, mg. | No. | Amount, mg. | General | Spectral | | |
| 1.0 | | | | | 18 | -------- | 0.28 | -------- |
| 1.1 | I/13 | 20 | -------- | | 19 | 18 | 0.30 | 730 |
| 1.2 | I/13 | 20 | II/8 | 20 | 20 | 20 | 0.30 | 730 |
| 2.0 | | | | | 16.5 | -------- | 0.24 | -------- |
| 2.1 | I/13 | 20 | -------- | | 19 | 18 | 0.27 | 730 |
| 2.2 | I/13 | 20 | II/9 | 20 | 21 | 21 | 0.30 | 730 |
| 3.0 | | | | | 18 | 5 | 0.22 | -------- |
| 3.1 | I/13 | 20 | -------- | | 19 | 18 | 0.34 | 730 |
| 3.2 | I/13 | 20 | II/10 | 20 | 21 | 21 | 0.30 | 730 |
| 3.3 | I/13 | 20 | II/15 | 20 | 21.5 | 20 | 0.30 | 730 |
| 3.4 | I/13 | 20 | II/12 | 20 | 21 | 21 | 0.27 | 730 |
| 4.0 | | | | | 14 | 2 | 0.18 | -------- |
| 4.1 | I/8 | 30 | -------- | | 18 | 17.5 | 0.27 | 725 |
| 4.2 | I/8 | 15 | II/1 | 15 | 18.5 | 18 | 0.22 | 720 |
| 4.3 | I/8 | 20 | II/1 | 10 | 19 | 18.5 | 0.22 | 720 |

EXAMPLE 3

A photographic silver bromide iodide emulsion similar to that used in example 2, which however, contained only 4.0 mol percent of silver iodide and 0.3 mol silver halide per kg. was applied onto a cellulose triacetate support.

Further processing was accomplished as described in example 2. The sensitometric results are shown in the following table 3.

then applied onto a cellulose triacetate support in the usual manner and dried.

Further processing was accomplished as described in example 2, with the difference, however, that now there is used a yellow filter whose transmission of light having a wavelength shorter than 460 millimicrons is less than 0.1 percent and the transmission of which for light having a wavelength of 520 millimicrons and longer is higher than 90 percent. The sensitometric results are shown in the following table 4.

TABLE 4

| Experiment | Sensitizing dyes | | | | | | Spectral sensitivity |
|---|---|---|---|---|---|---|---|
| | Formula I | | Formula II | | | | |
| | No. | Amount, mg. | No. | Amount, mg. | No. | Amount, mg. | |
| 1.0 | I/14 | 34 | -------- | | -------- | | 20.5 |
| 1.1 | I/14 | 34 | II/32 | 23 | II/33 | 23 | 22 |
| 1.2 | I/14 | 34 | II/32 | 23 | II/8 | 23 | 21.5 |
| 1.3 | I/14 | 34 | II/32 | 23 | II/18 | 23 | 22 |
| 1.4 | I/14 | 34 | II/38 | 23 | II/33 | 23 | 22 |
| 1.5 | I/14 | 34 | II/38 | 23 | II/8 | 23 | 22 |
| 1.6 | I/14 | 34 | II/38 | 23 | II/18 | 23 | 22.5 |
| 2.0 | I/8 | 34 | -------- | | -------- | | 22 |
| 2.1 | I/8 | 34 | II/32 | 23 | II/33 | 23 | 23 |
| 2.2 | I/8 | 34 | II/32 | 23 | II/8 | 23 | 23 |
| 2.3 | I/8 | 34 | II/32 | 23 | II/18 | 23 | 22 |
| 2.4 | I/8 | 34 | II/38 | 23 | II/33 | 23 | 22 |
| 2.5 | I/8 | 34 | II/38 | 23 | II/8 | 23 | 22.5 |
| 2.6 | I/8 | 34 | II/38 | 23 | II/18 | 23 | 22 |
| 3.0 | I/9 | 34 | -------- | | -------- | | 19 |
| 3.1 | I/9 | 34 | II/32 | 23 | II/33 | 23 | 20 |
| 3.2 | I/9 | 34 | II/32 | 23 | II/8 | 23 | 20 |
| 3.3 | I/9 | 34 | II/32 | 23 | II/18 | 23 | 20 |
| 3.4 | I/9 | 34 | II/38 | 23 | II/33 | 23 | 20 |
| 3.5 | I/9 | 34 | II/38 | 23 | II/8 | 23 | 20 |
| 3.6 | I/9 | 34 | II/38 | 23 | II/18 | 23 | 20.5 |

TABLE 3

| Experiment | Sensitizing dyes | | | | Sensitivity | | Fog | Sensitization maximum, mμ |
|---|---|---|---|---|---|---|---|---|
| | Formula I | | Formula II | | | | | |
| | No. | Amount, mg. | No. | Amount, mg. | General | Spectral | | |
| 1.0 | | | | | 14.5 | 0.5 | 0.24 | -------- |
| 1.1 | I/13 | 30 | -------- | | 17.5 | 17 | 0.30 | 730 |
| 1.2 | I/13 | 60 | -------- | | 18 | 17 | 0.45 | 740 |
| 1.3 | I/13 | 20 | II/1 | 10 | 18 | 17.5 | 0.30 | 750 |
| 1.4 | I/13 | 40 | II/1 | 20 | 19 | 18 | 0.38 | 735 |

Example 4

A silver halide emulsion of medium sensitivity having the following composition:
- 88.4 mol percent of silver bromide
- 2.5 mol percent of silver iodide
- 9 mol percent of silver chloride, and containing 0.3 mol of silver halide per kg., is divided into several portions.

Sensitizing dyes in amounts per kg. shown in the following table 4 are added to the individual samples. The emulsions are

EXAMPLE 5

Several samples of the emulsion of example 4 and sensitized with the dyes shown in the following table are processed as described in example 2 to compare the general sensitivity and the spectral sensitization sensitivity with the difference, however, that a yellow filter is used as described in example 4. The sensitometric results are shown in the following table 5.

TABLE 5

| Experiment | Sensitizing dyes | | | | Sensitivity | | Fog | Sensitization maximum, mμ |
|---|---|---|---|---|---|---|---|---|
| | Formula I | | Formula II | | | | | |
| | No. | Amount, mg. | No. | Amount, mg. | General | Spectral | | |
| 1.0 | | | | | 12.5 | 16.5 | 0.16 | |
| 1.1 | I/14 | 30 | | | 23.5 | 24 | 0.29 | |
| 1.2 | I/14 | 30 | II/11 | 35 | 24.5 | 24.5 | 0.30 | 730 |
| 2.0 | | | | | 17.5 | 16.5 | 0.16 | |
| 2.1 | I/14 | 40 | | | 24 | 24.5 | 0.36 | 730 |
| 2.2 | I/14 | 40 | II/11 | 25 | 25.5 | 25.5 | 0.28 | 730 |
| 2.3 | I/14 | 40 | II/29 | 25 | 24.5 | 25 | 0.46 | 730 |
| 2.4 | I/14 | 40 | II/30 | 25 | 25 | 25 | 0.38 | 730 |
| 2.5 | I/14 | 40 | II/31 | 25 | 25 | 25.5 | 0.36 | 730 |

We claim:

1. A silver halide emulsion sensitized to red by sensitizing amounts of at least one sensitizing dye of each of the following formulae:

I and

II wherein
- Q and Q'' represent sulfur or selenium;
- Y stands for hydrogen, a dioxy methylene or a fused-on benzene ring or one or more substituents selected from halogen, alkyl, alkoxy and alkylthio;
- R represents alkyl having up to 3 carbon atoms;
- R'' and R''' represent alkyl, sulfo substituted alkyl, sulfato substituted alkyl, carboxy substituted alkyl, hydroxyl substituted alkyl or alkyl substituted by -SO$_2$-NH-CO-alkyl or CO-NH-SO$_2$-alkyl;
- Z stands for hydrogen, alkyl with up to 3 carbon atoms, alkyoxy or a fused-on benzene ring;
- A and B represent hydrogen, halogen, alkyl, alkoxy, alkylthio, a fused-on benzene ring or a dioxy methylene group; and
- X$^1$ is an anion where the remainder of the dye has a net positive charge.

2. The emulsion of claim 1, wherein the sensitizing dyes have the following formulae:

3. The emulsion of claim 1, wherein the sensitizing dyes have the following formulae:

4. The emulsion of claim 1, wherein the sensitizing dyes have the following formulae:

and

5. The emulsion of claim 1, wherein the sensitizing dyes have the following formulae:

and

6. The emulsion of claim 1, wherein the sensitizing dyes have the following formulae:

and

7. The emulsion of claim 1, wherein the sensitizing dyes have the following formulae:

and and

8. The emulsion of claim 1, which contains a stabilizing quantity of a hydroxyl- or amino substituted tetra- or pentaazaindene stabilizer.

UNITED STATES PATENT OFFICE
CERTIFICATE OF CORRECTION

Patent No. 3,615,634　　　　　　　　　Dated Oct. 26, 1971

Inventor(s) Johannes Gotze et al

It is certified that error appears in the above-identified patent and that said Letters Patent are hereby corrected as shown below:

Column 1, line 39, "selnoquinocarbocyanines" should read -- selenoquinocarbocyanines -- .
Column 1, line 40, "henzoquinoline" should read -- benzoquinoline -- .
Column 1, line 46, "substituents" should be -- optically -- .
Column 2, formula I/1, the left hand ring system should read --

Column 3, formula I/2, the left hand ring system should read --

Column 6, dyes I/11 and I/12, the sensitization maximum figures to the right of the formulae, should read -- 715 -- ; -- 720 -- , respectively.
Column 6, formula I/12, the right hand ring system should read --

Patent No. 3,615,634    Dated Oct. 26, 1971

Inventor(s) Johannes Gotze et al    PAGE - 2

Claim 1, column 19, lines 47 and 48, "alkyoxy" should read
-- alkoxy -- .

Claim 2, column 19, last formula, should read --

Signed and sealed this 1st day of August 1972.

(SEAL)
Attest:

EDWARD M. FLETCHER, JR.          ROBERT GOTTSCHALK
Attesting Officer                Commissioner of Patents